(12) United States Patent
Kim et al.

(10) Patent No.: US 7,099,408 B2
(45) Date of Patent: Aug. 29, 2006

(54) APPARATUS AND METHOD FOR SIGNAL PROCESSING

(75) Inventors: Ki-hyun Kim, Seoul (KR); Joong-eon Seo, Gyeonggi-do (KR); Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 895 days.

(21) Appl. No.: 09/994,928

(22) Filed: Nov. 28, 2001

(65) Prior Publication Data

US 2002/0097815 A1 Jul. 25, 2002

(30) Foreign Application Priority Data

Nov. 30, 2000 (KR) ............................... 2000-72122

(51) Int. Cl.
*G11B 5/09* (2006.01)
*G11B 20/10* (2006.01)
(52) U.S. Cl. ...................... 375/340; 360/65; 369/59.17
(58) Field of Classification Search ................ 375/340, 375/354, 341; 360/55, 65; 369/59.17
See application file for complete search history.

(56) References Cited

U.S. PATENT DOCUMENTS 6,002,730 A * 12/1999 Kim et al. .................. 375/371
6,697,311 B1 * 2/2004 Kim .......................... 369/59.1

FOREIGN PATENT DOCUMENTS

| JP | 6-231547  | 8/1994  |
| JP | 7-93899   | 4/1995  |
| JP | 7-93925   | 4/1995  |
| JP | 8-293164  | 11/1996 |
| JP | 9-63010   | 3/1997  |
| JP | 10-50000  | 2/1998  |
| JP | 11-213570 | 8/1999  |
| JP | 11-259987 | 9/1999  |

OTHER PUBLICATIONS

Coding Theory, pp. 30-32.
Japanese Office Action dated Feb. 24, 2004.

\* cited by examiner

*Primary Examiner*—Jay K. Patel
*Assistant Examiner*—David B. Lugo
(74) *Attorney, Agent, or Firm*—Stein, McEwen & Bui, LLP

(57) ABSTRACT

A maximum error region determining unit determines a region having a maximum likelihood of error from a channel signal y(t). An optimal path searching unit uses only an error signal at the region having a maximum likelihood of error to find a minimum error generation path and to correct the error signal. A signal recovery unit applies a predetermined algorithm to the channel signal y(t) in which a part of the signal has been corrected by the optimal path searching unit in order to recover an original recorded signal $a_k$. The signal processing apparatus and method search for an optimal path of a channel signal only in the maximum error generation region, thereby reducing complexity and simplifying implementing hardware while allowing for signal processing without change in hardware where changes in a channel model or conditions of an input signal occur.

21 Claims, 3 Drawing Sheets

FIG. 3
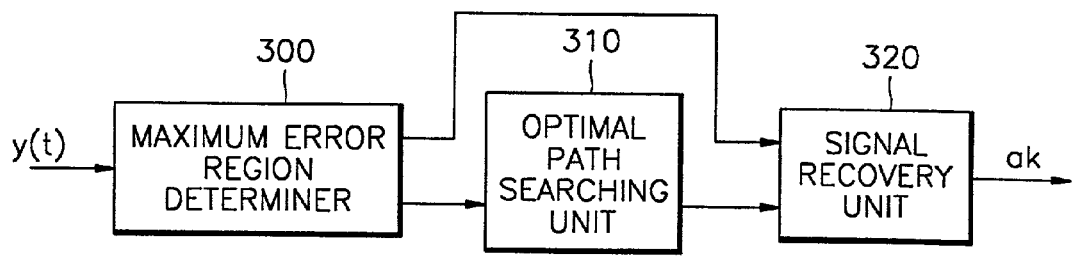
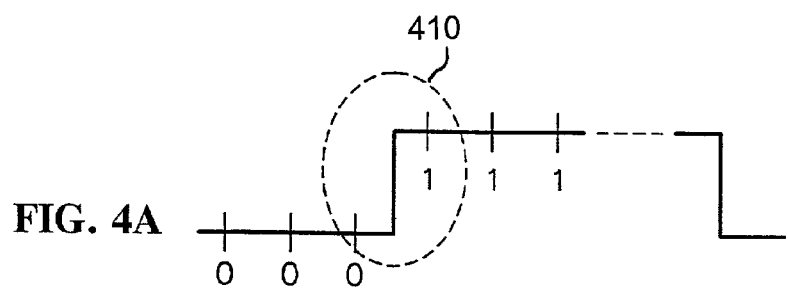
FIG. 4A
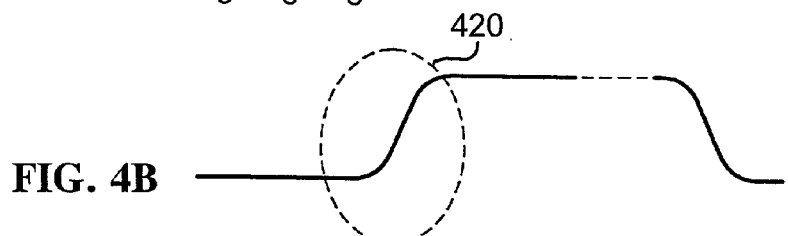
FIG. 4B
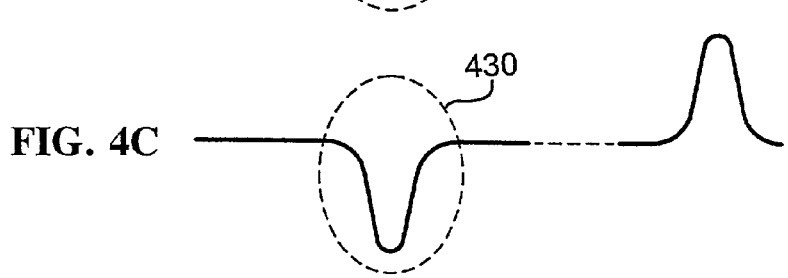
FIG. 4C

APPARATUS AND METHOD FOR SIGNAL PROCESSING

CROSS-REFERENCE TO RELATED APPLICATIONS

This application claims the benefit of Korean Application No. 2000-72122 filed Nov. 30, 2000 in the Korean Patent Office, the disclosure of which is incorporated herein by reference.

BACKGROUND OF THE INVENTION

1. Field of the Invention

The present invention relates to signal processing, and more particularly, to a signal processing apparatus for and a method of reproducing a signal read from a predetermined channel by detecting a part of the signal in which an error occurs most frequently and correcting the errors in the signal.

2. Description of the Related Art

There are several well known methods of reproducing a signal read from a communication channel or a channel on a recording medium including: slicer threshold detection, partial response maximum likelihood (PRML), and decision feedback equalization (DFE). In the slicer threshold detection method, a waveform of a signal read from a channel is shaped by an analog equalizer, and then the signal value is compared with a reference level. That is, if the signal value is above a reference level, it is determined to be a one "1", and if the signal value is below a reference level, it is determined to be a zero "0".

FIG. 1 shows a configuration of a typical PRML system. Referring to FIG. 1, the PRML system includes an equalizer having a feed-forward filter and a least mean square (LMS) algorithm block 100 for adjusting the coefficient of the equalizer according to a feedback signal ek, an error detector 110, and a Viterbi decoder 120. The equalizer and LMS algorithm block 100 equalizes a signal yk from a channel ("channel signal") to a desired form of channel response. Then, the error detector 110 detects errors from the equalized channel signal to output a corrected signal ak. The Viterbi decoder 120 takes into account all possible error paths to determine an optimal signal path, thereby estimating an original signal before the original signal passed through the channel.

FIG. 2 shows a configuration of a typical DFE system. Referring to FIG. 2, the DFE system includes first and second finite impulse response (FIR) filters 200 and 210 and a threshold determiner 220. The first FIR filter 200 is a feed-forward filter, and the second FIR filter 210 is a feed-back filter. A signal yk output from a channel is input into the first FIR filter 200. The threshold determiner 220 makes a temporary decision from the input signal and outputs the temporary decision value ak to the second FIR filter 210. The output values of the first and second FIR filters 200 and 210 are combined to change the temporary decision to a more reliable decision through a feedback signal ek.

Among the conventional signal detection methods described above, slicer threshold detection uses a simple slicer circuit but has low performance. Both the PRML and the DFE systems exhibit excellent performance but each has a large hardware complexity where the systems are realized with hardware. For example, the PRML system and the DFE system require a number of multipliers corresponding to the number of taps if the systems are implemented as a filter and a number of multipliers corresponding to about 2 times the number of filter taps times the number of filters in order to implement an adaptive algorithm. Thus, use of the PRML system or the DFE increases hardware complexity and decreases signal processing speed.

SUMMARY OF THE INVENTION

To solve the above problems, it is an object of the present invention to provide a signal processing apparatus and method, which reproduces a signal after correcting a part of the signal having the highest error rate using an optimal path detection algorithm, thereby reducing the complexity of implementing hardware and/or software.

Additional objects and advantages of the invention will be set forth in part in the description which follows, and, in part, will be obvious from the description, or may be learned by practice of the invention.

Accordingly, to achieve the above and other objects, the present invention provides a signal processing apparatus for reproducing an original signal $a_k$ input to a predetermined channel. The apparatus includes a maximum error region determining unit which determines a region having a maximum likelihood of error from a channel signal y(t) read from a channel having characteristics of h(t). An optimal path searching unit uses only an error signal at the region having the maximum likelihood of error determined by the maximum error region determining unit to find a minimum error generation path and correct the error signal. A signal recovery unit applies a predetermined algorithm to the channel signal y(t) in which a part of the signal has been corrected by the optimal path searching unit in order to recover the original recorded signal $a_k$.

Preferably, the maximum error region determining unit determines an interval, during which the probability of an input of the channel not being the same as an output of the channel is higher than a reference error rate determined by characteristics of the channel, to be the region having a maximum likelihood of error. Preferably, the optimal path searching unit compares a predetermined reference signal with a signal along each of a plurality of possible error paths present in the region having a maximum likelihood of error to select the error path having the smallest difference between the predetermined reference signal and a value of the signal along a respective one of the plurality of possible error paths, and replaces a signal along the selected error path with the reference signal. The signal recovery unit recovers the original signal ak from the channel signal y(t) using a threshold decision.

The present invention also provides a signal processing method of reproducing a channel input signal $a_k$. The method includes modeling a predetermined signal that has passed through a channel without being subjected to noise to obtain a reference signal x(t); obtaining a maximum error interval from an actual channel signal y(t) output where the input signal ak has passed through a channel having channel characteristics of h(t); extracting possible error paths from a signal $y_1(t)$ generated during the maximum error interval; computing a difference between a signal having each of the possible error paths and the reference signal x(t) and replacing a signal having an error path having the smallest difference with the reference signal x(t), thereby correcting the signal $y_1(t)$ during the maximum error interval; and recovering the original signal ak from the actual channel signal y(t) including the corrected error interval signal.

Preferably, the reference signal x(t) is a result of convolution of information $b_k$ and a transfer function h(t), where the information $b_k$ has a bit sequence including a component of the original signal $a_k$ recorded on a recording medium and a level transition portion, and the transfer function h(t) represents characteristics of the channel. Where the channel signal y(t) has two or more levels, the maximum error interval is obtained by setting a reference level between each of the signal levels of y(t) to determine a predetermined interval in the vicinity of a crossing point of the reference level and the channel signal y(t) as a maximum error region.

BRIEF DESCRIPTION OF THE DRAWINGS

The above object and advantages of the present invention will become more apparent by describing in detail embodiments thereof with reference to the attached drawings in which:

FIG. 3 is a block diagram of a signal processing apparatus according to the present invention;

FIG. 4A is an example of an original input signal sequence before passing through a predetermined channel;

FIG. 4B is a waveform of a signal y(t), which is output as a result of passing the signal sequence shown in FIG. 4A through a channel in the form of a low pass filter on a recording medium such as an optical disc;

FIG. 4C is a waveform of a signal y(t) which is output as a result of passing the signal sequence of FIG. 4A through a differential channel on a recording medium such as a hard disc;

DESCRIPTION OF THE PREFERRED EMBODIMENTS

Figure 1:
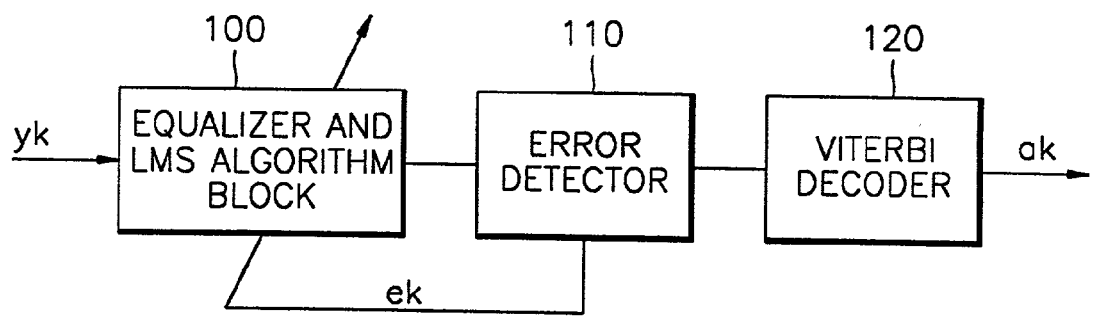
FIG. 1 shows a configuration of a typical partial response maximum likelihood (PRML) system.
Figure 2:
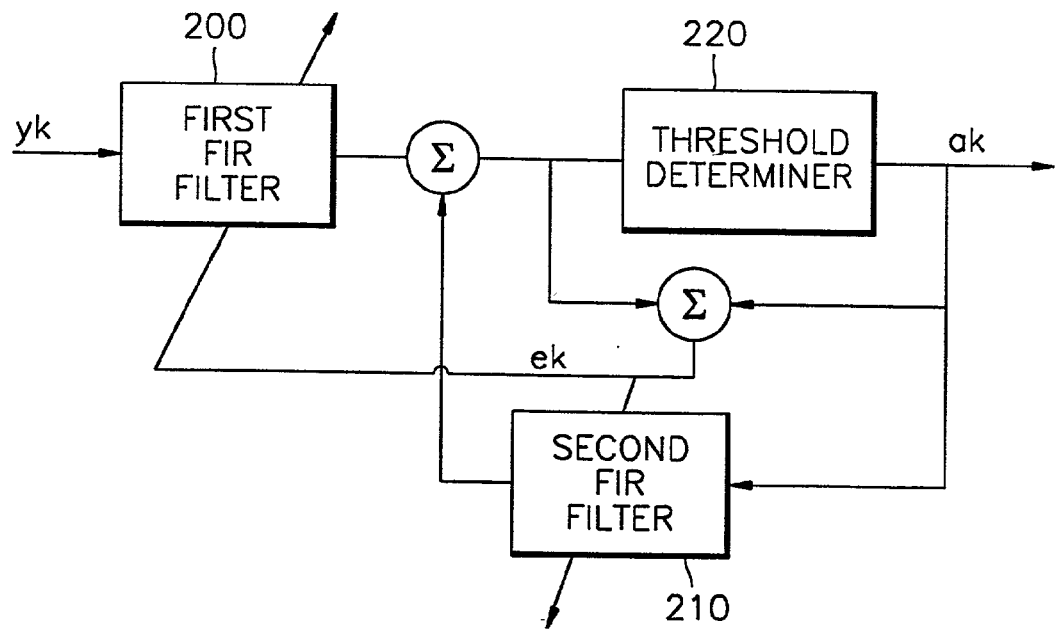
FIG. 2 shows a configuration of a typical decision feedback equalizer (DFE) system.

Reference will now be made in detail to the present embodiments of the present invention, examples of which are illustrated in the accompanying drawings, wherein like reference numerals refer to like elements throughout.

Referring to FIG. 3, a signal processing apparatus according to the present invention comprises a maximum error region determiner 300, an optimal path searching unit 310, and a signal recovery unit 320. The maximum error region determiner 300 determines a part (or region) of an input signal y(t) having a maximum error. The input signal y(t) is a result of reading a signal $a_k$ recorded on a recording medium from the recording medium having channel characteristics of h(t). The input signal y(t) is given by Equation (1):

$$y(t) = \sum_k a_k h(t - kT) + n(t) \quad (1)$$

where $a_k$ denotes a digital signal having a component $\{1,-1\}$ or represented by L levels, k is a number of sampling, t is a time, T is a sampling interval, and n(t) is white Gaussian noise. The channel transfer function h(t) represents characteristics of a medium during transmission and storing of a digital signal. FIG. 4A is an example of an original input signal sequence before passing through a channel, FIG. 4B is an example of a signal y(t), which is output as a result of passing the signal sequence shown in FIG. 4A through a channel in the form of a low pass filter on a recording medium such as an optical disc, and FIG. 4C is an example of a signal y(t), which is output as a result of passing the signal sequence of FIG. 4A through a differential channel on a recording medium such as a hard disc. In FIGS. 4A, 4B, and 4C, the portion of the signals included in the regions denoted by 410, 420 and 430, respectively are exemplary regions where erroneous signals frequently occur.

The maximum error region determiner 300 detects a part or a region of the signal y(t) where an error occurs most frequently and a signal $y_1(t)$ at that part defined by Equation (2):

$$y_1(t) = arg\{y_k\}(\{1 - P_{th}(y_k|a_k)\} > \sigma) \quad (2)$$

where σ denotes a probability that an error will occur at a saturation level of the detected signal $y_1(t)$, and $p_{th}(y_k|a_k)$ denotes a probability of a channel output signal y(t) being the same as the input signal $a_k$, the signal (stream) originally recorded. That is, $y_1(t)$ is the signal at a part where the probability of an input signal not being the same as an output signal on a channel is higher than the probability σ determined by channel characteristics. The signal $y_1(t)$ may be detected by threshold detection techniques. That is, in the channel signal as shown in FIG. 4B, an intermediate value is set to find a crossing point of the channel signal y(t) and an intermediate value level. A predetermined interval in close proximity of the crossing point is detected as a maximum error region, and a signal over the region is detected as $y_1(t)$. As is evident from FIG. 4B, the point at which the input signal y(t) crosses a level having a value between 0 and 1 is in an interval during which a signal transition occurs. Thus, the predetermined interval in close proximity of the crossing point is an interval including a transition interval of the signal y(t), and is determined to be a region having a maximum likelihood of error. In the channel signal as shown in FIG. 4C, there are three signal levels. That is, an intermediate value level between each of the three signal levels is set to obtain upper and lower intermediate values. A crossing point of each of the upper and lower intermediate value levels and the channel signal y(t) is found to determine a predetermined interval in close proximity of the crossing point as a region having a maximum likelihood of error and a signal over the region as $y_1(t)$. Similarly, since the points at which the two set intermediate value levels cross the channel signal y(t) are in an interval during which transition of the channel signal y(t) occurs, a signal transition interval, which is the predetermined interval in close proximity of the crossing point, is determined to be a region having a maximum likelihood of error. In channels having two or more channel signal levels due to channel characteristics other than as shown in FIGS. 4B and 4C, a respective predetermined level is set between each of the signal levels in order to detect an error region, thereby finding a predetermined interval in the vicinity of a crossing point of the respective predetermined level set in the manner described above and the channel signal and determining the respective predetermined level as a maximum error region.

Figure 5A:
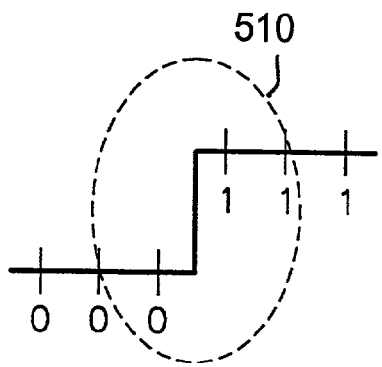
FIG. 5A is an example of an original signal before recording it on a recording medium.
Figure 5B:
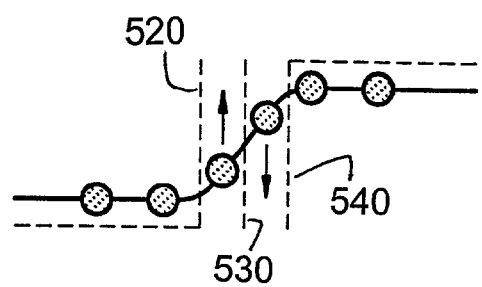
FIG. 5B shows a presence of various error paths at a (signal) part having a maximum error detected after having recorded the original signal shown in FIG. 5A on a recording medium.

The optimal path searching unit 310 of FIG. 3 first searches for possible error paths for the signal y1(t) during the interval detected by the maximum error region determiner 300. For example, if a reference value is used in Equation (4) in the order of {x1, x2, x3, x4, x5, x6}, the corresponding signal y1(t) may have a sequence of {c1, c2, c3, c4, c5, c6}, and other possible error paths may be assumed to have a sequence of {c2, c3, c4, c5, c6, c7} or {c0, c1, c2, c3, c4, c5}. FIG. 5A is an example of an original signal before recording onto a recording medium, and FIG. 5B shows an existence of various error paths at a region having a maximum likelihood of error of a signal detected after having recorded the original signal shown in FIG. 5A on a recording medium. The region denoted by 510 in FIG. 5A is an exemplary region where an erroneous signal frequently occurs. In FIG. 5B, the lines 520, 530 and 540 also identify portions of a signal where an erroneous signal frequently occurs. The shaded circles in FIG. 5B represent positions of the signal where the signal is read (or detected) and the up and down arrows indicate that a part of the signal in the region including the up and down arrows is changeable and inconsistent.

The optimal path searching unit 310 determines a reference signal xn defined by Equation (3):

$$x_{n,k} = \sum_{p} b_{n,p} h(kT - pT), \quad b_n = \{\ldots a_{k-1}, a_k, a_{k+1}, \ldots\} \quad (3)$$

where $b_n$ is a possible signal stream having a sequence including component of a recorded signal $a_k$ and a portion in which a level transition occurs. An example of $b_n$ is shown in Table 1.

TABLE I

| n | ... | $b_{n,-k}$ | ... | $b_{n,-1}$ | $b_{n,0}$ | $b_{n,1}$ | $b_{n,2}$ | ... | $b_{n,k}$ | ... |
|---|---|---|---|---|---|---|---|---|---|---|
| 1 | ...1 | 1 | 1 | 1 | 1 | -1 | -1 | -1 | 1 | 1... |
| 2 | ...1 | 1 | 1 | 1 | 1 | -1 | -1 | -1 | 1 | 1... |
| . | . | | | | | | | | | |
| . | . | | | | | | | | | |
| . | . | | | | | | | | | |
| n | ...1 | 1 | 1 | 1 | 1 | -1 | -1 | -1 | -1 | -1... |
| n+1 | ...1 | 1 | -1 | -1 | -1 | 1 | 1 | 1 | 1 | 1... |
| . | . | | | | | | | | | |
| . | . | | | | | | | | | |
| . | . | | | | | | | | | |
| N | ...-1 | -1 | -1 | -1 | -1 | 1 | 1 | 1 | 1 | 1... |

The signal stream $b_n$ has a sequence which satisfies a minimum run-length limited (RLL) d constraint applied to the recorded signal $a_k$. Table 1 is related to d=2. The reference signal $x_n$ is represented by convolution of $b_n$ and the channel transfer function h(t). That is, the reference signal $x_n$ is an ideal channel signal model output where a predetermined signal having a sequence including a channel input signal component and a level transition portion is read from a channel without being subjected to noise. An index of level transition that can possibly occur is represented by n, where n has values from 1 to N.

A metric between a signal along each error path for the signal $y_1(t)$ described above and the reference signal $x_n$ may be obtained from Equation (4):

$$D(y_m, x_n) = \sum_{k} |y_{m,k} - x_{n,k}|, \text{ or } D(y_m, x_n) = \sum_{k} (y_{m,k} - x_{n,k})^2 \quad (4)$$

where m, which is from 1 to M, represents an index of possible error paths determined by the optimal path searching unit 310, and n in $x_n$ represents an index corresponding to one of reference signals $x_n$. However, it is not actually necessary to compute an error metric for all error paths and all reference signals. Rather, it is preferable that some of all cases are selected to apply the Equation (4). A signal path having the smallest error metric computed from Equation (4) is selected to replace signal values of the selected signal path by the reference signal $x_n$. Therefore, a maximum error-including part of a signal is corrected.

The signal recovery unit 320 applies a simple threshold decision or an algorithm appropriate for a channel model to the signal y(t) including the corrected maximum error-including part, thereby recovering an original recorded signal $a_k$.

Figure 6:
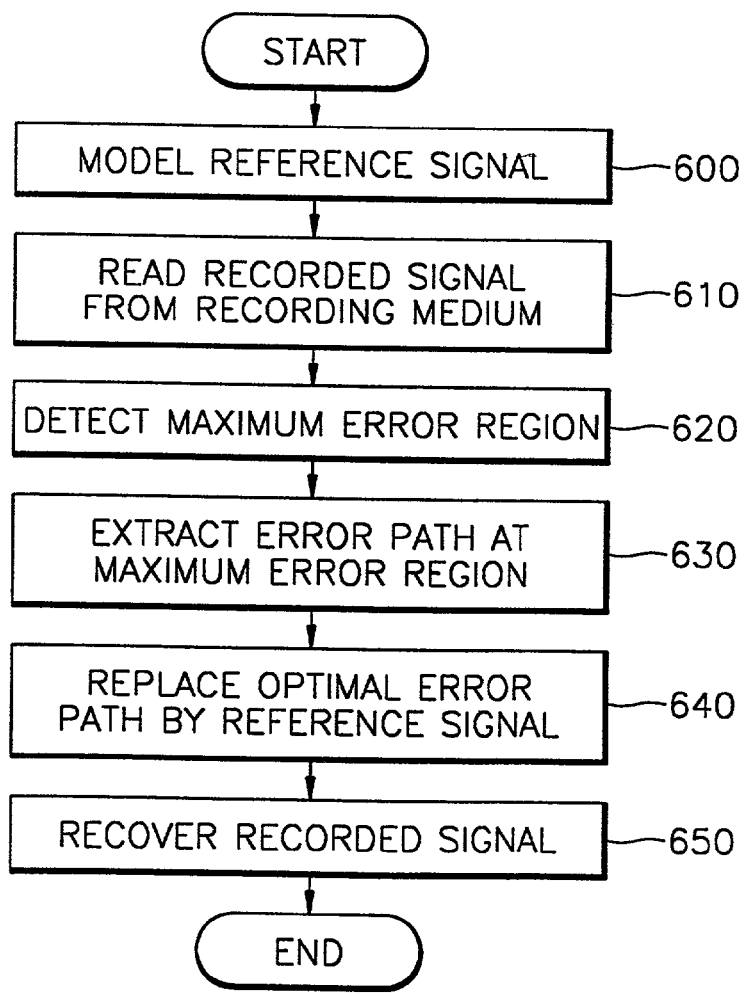
FIG. 6 is a flowchart of a signal processing method according to the present invention.

FIG. 6 is a flowchart of a signal processing method according to the present invention. Referring to FIG. 6, first, a reference signal x(t) is computed at operation 600. The reference signal x(t) is an ideal result output where information bk, which has the same signal component as a signal ak before recording onto a predetermined channel and a portion in which level transition occurs, passes through a channel having a channel transfer function h(t). Also, the information bk satisfies an RLL constraint of the signal ak. The reference signal x(t) is computed from Equation (3), which is the result of convolution of the information bk and the channel transfer function h(t). A channel output signal having the inherent channel characteristics h(t) is read at operation 610. The read signal y(t) is a combination of noise and the result of convolution of the recorded signal ak and the channel transfer function h(t) as defined by Equation (1). A signal interval, during which error rate is above a predetermined reference level, is detected from the read signal y(t) at operation 620. Here, the predetermined reference level refers to an error rate which can be expected from a signal output passing through a channel where channel characteristics of a recording medium are considered, as shown in Equation (2). To implement this, in a channel on an optical disc, an intermediate value is set to measure a crossing point for the intermediate value level, thereby detecting a predetermined interval positioned in close proximity of the crossing point as a maximum error region and a signal over the region as y1(t). Since the point at which the signal y(t) crosses the intermediate value level is an interval during which a signal transition occurs, the predetermined interval in the vicinity of the crossing point is a region having a maximum likelihood of error. On the other hand, in a channel on a hard disc, upper and lower levels are set to measure a crossing point of the signal y(t) and each of the upper and lower levels, thereby detecting a predetermined interval in the vicinity of the crossing point as a maximum error region and a signal over the region as y1(t). Similarly, since the point at which each level crosses the signal y(t) is an interval during which a signal transition occurs, the predetermined interval in the vicinity of the crossing point is determined to be a region having a maximum likelihood of error. In a channel having other characteristics, where a signal after passing through the channel has two or more levels, a predetermined level value is set between each of the signal levels to determine a region having a maximum likelihood of error by measuring a crossing point of the predetermined level value and the channel signal in the manner described above. Then, all possible error paths are extracted from the signal y1(t) in the region having a maximum likelihood of error at operation 630. This extraction is made in the same manner as that described above with reference to FIG. 3. A difference between a signal along each of the error paths and the reference signal x(t) is obtained from Equation (4) to select an error path having the smallest difference (D) and replace the signal along the selected path by the reference signal x(t) at operation 640. Operation 640 corrects an error signal at a region having a maximum likelihood of error to a normal signal. Finally, a simple threshold decision is applied to a part of a channel signal y(t) in the region having a maximum likelihood of error corrected as in the operation 640 and the rest of the signal or an appropriate algorithm is applied to other channel output having two or more input levels, thereby performing recovery of the original recorded signal ak at operation 650.

According to the present invention, an error correction algorithm is applied to only a part of a channel signal which is likely to have the highest error rate, thereby reducing the complexity and time for implementation of algorithm. The signal processing apparatus and method according to the present invention reduce the complexity of hardware such as filters or equalizers and multipliers while eliminating a need to use an LMS algorithm for channel adaptation. In addition, if a channel model and a RLL constraint of the input signal are changed, the signal processing apparatus and method allow for signal processing adaptively adjusted according to the changes by resetting the reference signal x(t).

The present invention searches for an optimal path of a channel signal only in a maximum error generation region, thereby reducing complexity as compared with implementation of an LMS algorithm and simplifying hardware implemented while allowing for signal processing without change in hardware where changes in a channel model or conditions of an input signal occur.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A signal processing apparatus for reproducing an original recorded signal $a_k$ from a predetermined channel signal y(t), the apparatus comprising:

a maximum error region determining unit which determines a region having a maximum likelihood of error from the channel signal y(t);

an optimal path searching unit which uses only an error signal at the region having the maximum likelihood of error determined by the maximum error region determining unit to find a minimum error generation path and to correct a part of the channel signal; and a signal recovery unit which applies a predetermined algorithm to the channel signal y(t) in which the part of the signal has been corrected by the optimal path searching unit in order to recover the original recorded signal $a_k$, wherein;

the maximum error region determining unit determines an interval, during which a probability of an input of a channel, from which the channel signal y(t) is reproduced, not being the same as an output of the channel is higher than a reference error rate determined by characteristics of the channel, to be the region having the maximum likelihood of error.

2. The apparatus of claim 1, wherein the signal recovery unit recovers the original signal $a_k$ from the channel signal y(t) using a threshold decision.

3. A signal processing apparatus for reproducing an original recorded signal $a_k$ from a predetermined channel signal y(t), the apparatus comprising:

a maximum error region determining unit which determines a region having a maximum likelihood of error from the channel signal y(t);

an optimal path searching unit which uses only an error signal at the region having the maximum likelihood of error determined by the maximum error region determining unit to find a minimum error generation path and to correct a part of the channel signal; and a signal recovery unit which applies a predetermined algorithm to the channel signal y(t) in which the part of the signal has been corrected by the optimal path searching unit in order to recover the original recorded signal $a_k$, wherein:

where the channel signal y(t) is reproduced from an optical disc, the maximum error region determining unit sets a predetermined level to determine a predetermined interval positioned in the vicinity of a crossing point of the predetermined level and the channel signal y(t).

4. The apparatus of claim 3, wherein the signal recovery unit recovers the original signal $a_k$ from the channel signal y(t) using a threshold decision.

5. A signal processing apparatus for reproducing an original recorded signal $a_k$ from a predetermined channel signal y(t), the apparatus comprising:

a maximum error region determining unit which determines a region having a maximum likelihood of error from the channel signal y(t);

an optimal path searching unit which uses only an error signal at the region having the maximum likelihood of error determined by the maximum error region determining unit to find a minimum error generation path and to correct a part of the channel signal; and a signal recovery unit which applies a predetermined algorithm to the channel signal y(t) in which the cart of the signal has been corrected by the optimal path searching unit in order to recover the original recorded signal $a_k$, wherein:

where the channel signal y(t) is reproduced from a hard disc, the maximum error region determining unit sets predetermined upper and lower levels to determine a predetermined interval positioned in the vicinity of a crossing point of each of the upper and lower levels and the channel signal y(t).

6. The apparatus of claim 5, wherein the signal recovery unit recovers the original signal $a_k$ from the channel signal y(t) using a threshold decision.

7. A signal processing apparatus for reproducing an original recorded signal $a_k$ from a predetermined channel signal y(t), the apparatus comprising:
- a maximum error region determining unit which determines a region having a maximum likelihood of error from the channel signal y(t);
- an optimal path searching unit which uses only an error signal at the region having the maximum likelihood of error determined by the maximum error region determining unit to find a minimum error generation path and to correct a part of the channel signal; and
- a signal recovery unit which applies a predetermined algorithm to the channel signal y(t) in which the part of the signal has been corrected by the optimal path searching unit in order to recover the original recorded signal $a_k$, wherein:
- the optimal path searching unit compares a predetermined reference signal with a signal along each of a plurality of possible error paths present in the region having the maximum likelihood of error to select the error path having a signal difference smaller than respective signal differences corresponding to the other possible error paths.

8. The apparatus of claim 7, wherein the optimal path searching unit replaces the signal along the selected error path with the reference signal.

9. The apparatus of claim 7, wherein the signal recovery unit recovers the original signal $a_k$ from the channel signal y(t) using a threshold decision.

10. A signal processing apparatus for reproducing an original recorded signal $a_k$ from a predetermined channel signal y(t), the apparatus comprising:
- a maximum error region determining unit which determines a region having a maximum likelihood of error from the channel signal y(t);
- an optimal path searching unit which uses only an error signal at the region having the maximum likelihood of error determined by the maximum error region determining unit to find a minimum error generation path and to correct a part of the channel signal; and
- a signal recovery unit which applies a predetermined algorithm to the channel signal y(t) in which the part of the signal has been corrected by the optimal path searching unit in order to recover the original recorded signal $a_k$, wherein:
- the optimal path searching unit uses a reference signal to obtain an error path wherein the reference signal is an ideal channel signal model output where a signal $b_n$ having a bit sequence including a component of the original recorded signal $a_k$ and a level transition portion passes through a channel without being subjected to noise.

11. The apparatus of claim 10, wherein the signal $b_n$ satisfies a run-length limited constraint of the original recorded signal $a_k$.

12. The apparatus of claim 10, wherein the optimal path searching unit searches for possible error paths for a signal $y_1(t)$ at the region having the maximum likelihood of error detected by the maximum error region determining unit, compares a signal along each of the error paths with the reference signal to determine respective signal differences, and determines the signal along the error path having the smallest signal difference as an optimal path signal.

13. The apparatus of claim 12, wherein the determined optimal path signal is replaced by the reference signal.

14. The apparatus of claim 10, wherein the signal recovery unit recovers the original signal $a_k$ from the channel signal y(t) using a threshold decision.

15. A signal processing method of reproducing an original signal $a_k$ from a channel signal y(t), the method comprising:
- modeling a predetermined signal that has passed through a channel without being subjected to noise to obtain a reference signal x(t);
- obtaining a maximum error interval from the channel signal y(t);
- extracting possible error paths from a signal $y_1(t)$ which corresponds to the part of signal y(t) occurring during the maximum error interval;
- computing respective differences between a signal corresponding to each of the possible error paths and the reference signal x(t) and replacing the signal corresponding to the error path having the smallest signal difference with the reference signal x(t), thereby correcting the signal $y_1(t)$ during the maximum error interval; and
- recovering the original signal $a_k$ from the channel signal y(t) including the corrected signal $y_1(t)$.

16. The method of claim 15, wherein the reference signal x(t) is the result of convolution of the information $b_k$, having a bit sequence including a component of the original signal $a_k$ recorded on a recording medium and a level transition portion, and a transfer function h(t) representing characteristics of the channel.

17. The method of claim 16, wherein the information $b_k$ satisfies a run-length limited constraint of the original signal $a_k$ recorded on the recording medium.

18. The method of claim 15, wherein, where the channel signal y(t) is reproduced from an optical disc, the maximum error interval is obtained by setting a predetermined level to determine a predetermined interval positioned in the vicinity of a crossing point of the predetermined level and the channel signal y(t) as a maximum error region.

19. The method of claim 15, wherein, where the channel signal y(t) is reproduced from a hard disc, the maximum error interval is obtained by setting predetermined upper and lower levels to determine a predetermined interval positioned in the vicinity of a crossing point of each of the upper and lower levels and the channel signal y(t) as a maximum error region.

20. The method of claim 15, wherein, where the channel signal y(t) has at least two signal levels, the maximum error interval is obtained by setting a respective reference level between each of the two or more signal levels to determine an interval in the vicinity of a crossing point of one of the respective reference levels and the channel signal y(t) as a maximum error region.

21. The method of claim 15, wherein the recovery of the signal is performed by recovering the recorded original signal $a_k$ through a threshold decision.

* * * * *

UNITED STATES PATENT AND TRADEMARK OFFICE
CERTIFICATE OF CORRECTION

| | | |
|---|---|---|
| PATENT NO. | : 7,099,408 B2 | Page 1 of 1 |
| APPLICATION NO. | : 09/994928 | |
| DATED | : August 29, 2006 | |
| INVENTOR(S) | : Ki-hyun Kim | |

It is certified that error appears in the above-identified patent and that said Letters Patent is hereby corrected as shown below:

Column 8, line 5, change " ;" to -- : --

Column 8, line 53, change "cart" to -- part --

Signed and Sealed this

Sixth Day of February, 2007

JON W. DUDAS
*Director of the United States Patent and Trademark Office*